(12) United States Patent
Ceolato et al.

(10) Patent No.: US 11,709,087 B2
(45) Date of Patent: Jul. 25, 2023

(54) SELF-CALIBRATING OPTICAL DEVICE FOR THE CONTACTLESS MEASUREMENT OF THE LEVEL OF A LIQUID

(71) Applicants: OFFICE NATIONAL D'ÉTUDES ET DE RECHERCHES AÉROSPATIALES, Palaiseau (FR); ARCYS, Blagnac (FR)

(72) Inventors: Romain Ceolato, Toulouse (FR); Nicolas Riviere, Toulouse (FR)

(73) Assignees: OFFICE NATIONAL D'ÉTUDES ET DE RECHERCHES AÉROSPATIALES, Palaiseau (FR); ARCYS, Blagnac (FR)

( * ) Notice: Subject to any disclaimer, the term of this patent is extended or adjusted under 35 U.S.C. 154(b) by 468 days.

(21) Appl. No.: 16/765,363

(22) PCT Filed: Nov. 16, 2018

(86) PCT No.: PCT/EP2018/081613
§ 371 (c)(1),
(2) Date: May 19, 2020

(87) PCT Pub. No.: WO2019/097013
PCT Pub. Date: May 23, 2019

(65) Prior Publication Data
US 2020/0340847 A1    Oct. 29, 2020

(30) Foreign Application Priority Data
Nov. 20, 2017  (FR) ..................................... 1760936

(51) Int. Cl.
*G01F 23/292*    (2006.01)
*G01S 7/481*     (2006.01)
*G01S 17/08*     (2006.01)

(52) U.S. Cl.
CPC ........ *G01F 23/2928* (2013.01); *G01S 7/4818* (2013.01); *G01S 17/08* (2013.01)

(58) Field of Classification Search
CPC .... G01F 23/292; G01F 23/2928; G01S 17/08; G01S 17/10; G01S 17/88; G01S 7/4818
(Continued)

(56) References Cited

U.S. PATENT DOCUMENTS 4,417,782 A  *  11/1983  Clarke ................... G01M 3/047
                                                    374/E11.015
4,692,023 A  *   9/1987  Ohtomo ................ G01F 23/292
                                                         356/5.11

(Continued)

FOREIGN PATENT DOCUMENTS

CA    2 730 161 A1    1/2010
DE    31 13 248 A1   10/1982
(Continued)

OTHER PUBLICATIONS

International Search Report as issued in International Patent Application No. PCT/EP2018/081613, dated Feb. 13, 2019.

*Primary Examiner* — Sunghee Y Gray
(74) *Attorney, Agent, or Firm* — Pillsbury Winthrop Shaw Pittman LLP

(57) ABSTRACT

An optical device for the contactless measurement of a liquid level contained in a storage device by an optical signal, the optical device including an optical unit fixedly positioned above the storage device and an electronic control unit capable of emitting an optical signal, dissociated from the optical unit and positioned at a distance from the optical unit. The optical unit includes a single channel for the emission and the reception of the optical signal. The optical unit is connected to the electronic control unit through an optical fibre capable of transmitting the optical signal emitted by the electronic control unit and an optical signal
(Continued)

reflected by the liquid. The optical fibre has first and second optical cores that juxtapose each other such that at least a part of the optical signal emitted in the first optical core of the optical fibre is backscattered in the second optical core.

8 Claims, 2 Drawing Sheets

(58) Field of Classification Search
USPC .......................................................... 250/577
See application file for complete search history.

(56) References Cited

U.S. PATENT DOCUMENTS

| | | |
|---|---|---|
| 5,919,706 A | 7/1999 | Tajima |
| 2009/0021722 A1* | 1/2009 | Tsukii ................ G01N 21/6452 |
| | | 356/73 |
| 2016/0138958 A1* | 5/2016 | Truong ................ G01F 23/292 |
| | | 250/227.28 |

FOREIGN PATENT DOCUMENTS

| | | |
|---|---|---|
| EP | 0 188 393 A1 | 7/1986 |
| EP | 0 274 091 A2 | 7/1988 |
| JP | S61-160075 A | 7/1986 |
| JP | S63-169521 A | 7/1988 |
| JP | H04-177195 A | 6/1992 |
| JP | H10-090561 A | 4/1998 |

\* cited by examiner

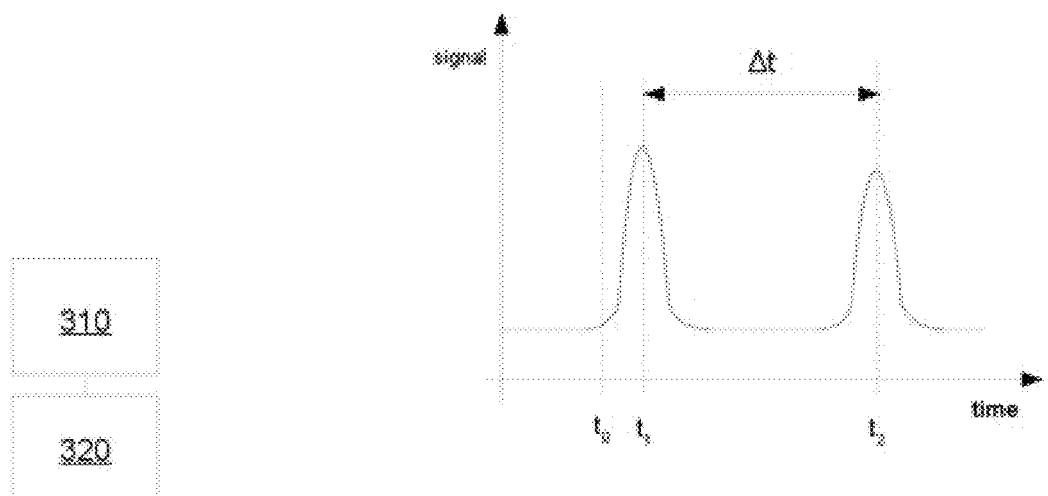
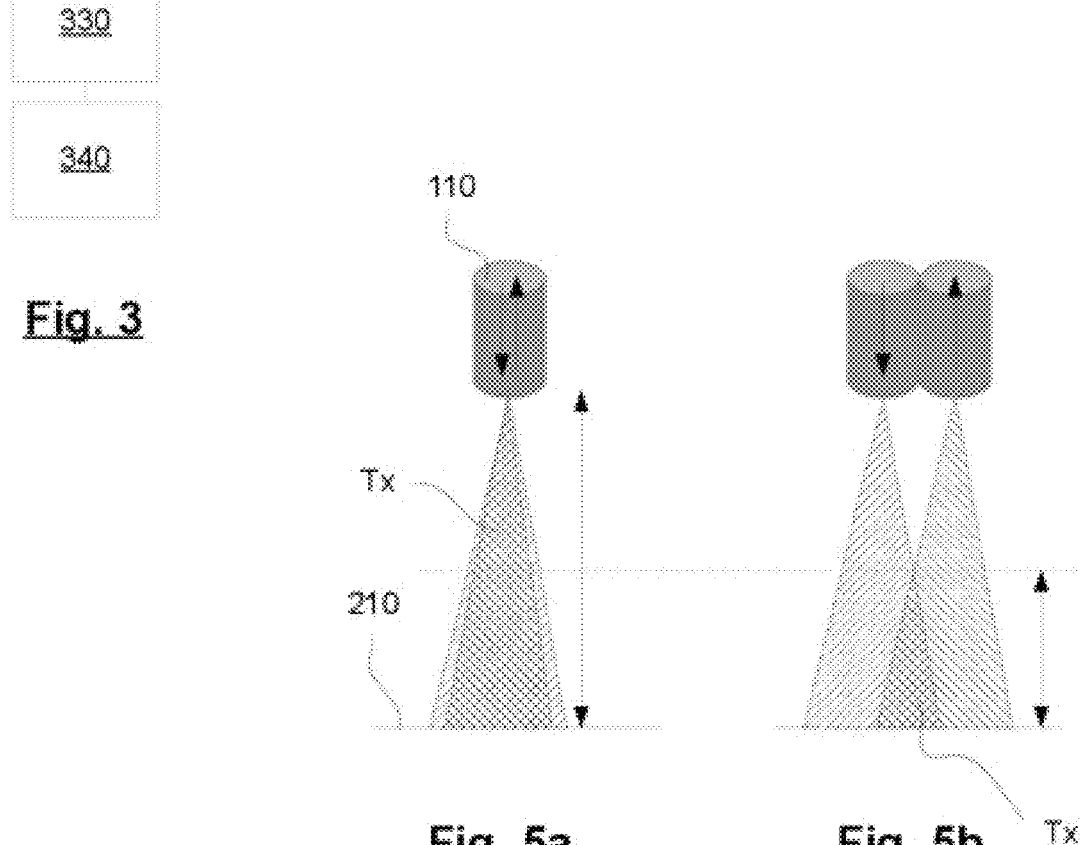

SELF-CALIBRATING OPTICAL DEVICE FOR THE CONTACTLESS MEASUREMENT OF THE LEVEL OF A LIQUID

CROSS-REFERENCE TO RELATED APPLICATIONS

This is the U.S. National Stage of PCT/EP2018/081613, filed Nov. 16, 2018, which in turn claims priority to French Application No. 1760936, filed Nov. 20, 2017, the entire contents of all applications are incorporated herein by reference in their entireties.

TECHNICAL FIELD OF THE INVENTION

The invention relates to the field of contactless measurement of the level of a liquid contained in a storage tank.

The invention more specifically relates to a method and an optical device for measuring precisely the level of a liquid contained in a storage means, whatever the measurement conditions and more specifically in degraded measurement conditions (high temperatures, high humidity level, considerable mist, boiling liquid).

The invention finds a particularly interesting application for the measurement of the level of water of fuel pools of a nuclear power plant.

PRIOR ART

In the civil nuclear field, it is very important to know with precision all of the parameters that govern the control of a nuclear power plant. Knowledge of the level of water in the fuel pools is thus vital since they store and cool a part of the radioactive elements of a nuclear power plant, and notably highly radioactive spent fuel.

To measure in a continuous manner the level of water in a fuel pool, it is known to use electromechanical devices. Such devices have a moveable float guided by a guide, the movements of the float closing more or less one electrical circuit as it moves vertically along the guide. However, this type of sensor has limits and poses difficulties of mounting on pools already in service. Indeed, the liner on the wall of the pool has to be pierced not far from the bottom to place therein a fastener and to guarantee a maintaining of the guide in the bottom so as to avoid pendulum phenomena and too high torsion of the guide. These devices are thus often difficult to use in existing fuel pools or in storage means of great depth, these devices often being limited to an amplitude of measurement less than 10 metres.

Another known solution consists in using the principle of ultrasonic wave pulses for the contactless measurement of the level of water by means of a radar sensor. The ultrasonic waves emitted by the antenna of the radar are reflected by the surface of the water on account of a change in dielectric coefficient then received by the receiver. Thus, the transit time of the ultrasonic waves is directly proportional to the distance covered. The level of water in the storage means may thus be calculated from the moment where the position of the radar is known in a precise manner. However, this type of measurement by radar pulses is very sensitive to the presence of water vapour in the air, and notably when the air is 100% saturated with water vapour. Consequently, this technology is difficult to use to measure precisely the level of water in degraded measurement conditions.

In addition, this technology is difficult to exploit in a civil nuclear environment because the radar positioned above a fuel pool comprises electrical/electronic components that make it sensitive to earthquakes, irradiations, high temperatures and pressures, very high humidity levels in the ambient environment.

In order to minimise the sensitivity of such a device in a civil nuclear environment, it is also known to use an optical sensor and the principle of measurement by time of flight (TOF). Such a device is notably described in the document CA 2730161 for the measurement of the level of a fluid in a tank.

The optical device described in the document CA 2730161 comprises an optical unit, exempt of any electrical/electronic components, positioned above the tank and a dissociated electronic control unit, situated at a distance from the optical unit, the two units being connected by two independent optical fibres. In operation, the optical unit emits, on the basis of triggering signals, a series of pulses which propagate in the form of an optical beam towards the surface of the fluid contained in the tank. A part of the optical beam is reflected towards the optical unit. The signals received are next processed by the electronic control unit to determine the distance between the optical unit and the surface of the fluid. The distance between the surface of the fluid and the optical unit is obtained by measuring the time taken by the pulses to go back and forth by means of an electronic clock. The optical unit comprises an emission channel and a reception channel, each channel being independently connected to the electronic control unit by an optical fibre.

However, such a device does not make it possible to obtain precise measurements without a prior calibration phase. In addition, there exists a non-negligible risk that the measurements become erroneous over time, notably by a time shift of the clock of the device. Finally, the Applicant has carried out a series of tests with the device described in the document CA 2730161, and it does not always make it possible to carry out precise and reliable measurements in degraded measurement conditions, notably with a high level of humidity.

DESCRIPTION OF THE INVENTION

In this context, the invention aims to overcome the drawbacks of the prior art by proposing an optical device for the contactless measurement of the level of a liquid making it possible to obtain a precise, reliable, repeatable measurement, without a calibration phase and which can be used in degraded measurement conditions which are those of the nuclear field and in storage means of great depth such as fuel pools having a depth which can go up to 20 metres.

To do so, the invention proposes an optical device for the contactless measurement of the level of a liquid contained in a storage means by means of an optical signal, said optical device comprising an optical unit fixedly positioned above the storage means and an electronic control unit capable of emitting an optical signal, dissociated from said optical unit and positioned at a distance from said optical unit, said optical device being characterised in that:
- the optical unit comprises a single channel for the emission and the reception of the optical signal;
- the optical unit is connected to the electronic control unit through an optical fibre capable of transmitting said optical signal emitted by the electronic control unit and an optical signal reflected by the liquid; said optical fibre having two optical cores that juxtapose each other such that at least a part of the optical signal emitted in said first optical core of said optical fibre is backscattered in said second optical core.

The optical device according to the invention may also have one or more of the following characteristics taken individually or according to all technically possible combinations thereof:
- the two cores of said optical fibre juxtapose each other at the level of a first end of said optical fibre so as to form a single strand;
- said first end of said optical fibre is situated at the level of said optical unit;
- the two optical cores have a different diameter;
- the optical core transmitting the optical signal emitted by the electronic control unit has a diameter less than the second optical core intended to receive the optical signal reflected by the surface of the liquid;
- at the level of a second end of said optical fibre connected to the electronic control unit, said optical fibre has two distinct strands, each being composed of a single optical core;
- the electronic control unit comprises means for determining the distance d separating said optical unit from the liquid contained in the storage means by measurement of the time of flight of the optical signal.

The invention also relates to a method for determining the level of a liquid contained in a storage means by means of an optical device according to the invention characterised in that it comprises:
- a step of emitting an optical signal by said electronic control unit: said optical signal propagating inside said optical fibre in the direction of the optical unit;
- a step of detecting, at an instant $t_1$, a first return signal corresponding to a part of said emitted signal backscattered inside the optical fibre at the level of the two juxtaposed cores;
- a step of detecting, at an instant $t_2$, a second return signal corresponding to a part of the emitted signal which is reflected by the surface of said liquid contained in the storage means (200);
- a step of calculating the level of the liquid by determination of the time of flight between the instant $t_1$ of detecting the first return signal and the instant $t_2$ of detecting the second return signal.

Advantageously, the method for determining the level of a liquid is a method for detecting the level of water in a nuclear reactor fuel pool.

BRIEF DESCRIPTION OF THE FIGURES

Other characteristics and advantages of the invention will become clear from reading the description that follows, with reference to the appended figures.

FIG. 3 is a synoptic diagram illustrating the main steps of a method for determining a liquid level by means of the optical device according to the invention.

FIG. 4 illustrates in the form of a graph the photons detected as a function of time by the control unit of the optical device according to the invention.

FIG. 5a illustrates the level of overlap obtained with the so-called monostatic optical device according to the invention in comparison with FIG. 5b illustrating the level of overlap obtained with a bistatic device according to the prior art.

In all the figures, common elements bear the same references unless stated otherwise.

DETAILED DESCRIPTION OF AN EMBODIMENT

Figure 1:
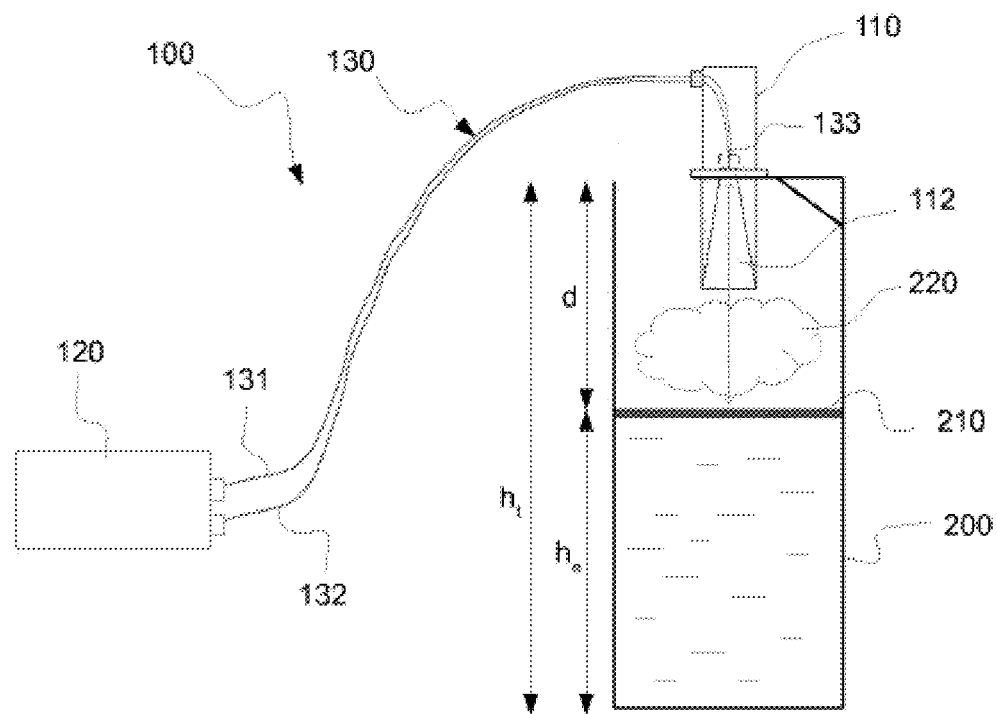
FIG. 1 schematically illustrates a first exemplary embodiment of an optical device according to the invention for the contactless measurement of the level of water in a storage means, such as a fuel pool.

FIG. 1 schematically illustrates a first exemplary embodiment of an optical device 100 for the contactless measurement of the level of water 210 in a storage means 200, such as a fuel pool.

The optical device 100 is particularly suited for the measurement of the level of water in degraded measurement conditions with high levels of humidity and for example in the presence of a mist 220 situated between the optical device 100 and the level of water 210 to measure.

The storage means 200 is for example a fuel pool having a total depth ($h_t$) of several tens of metres, typically of the order of 20 metres.

The optical device 100 according to the invention comprises an optical unit 110, exempt of any electrical/electronic component, fixedly positioned above the storage means 200 and a dissociated electronic control unit 120, situated at a distance from the optical unit 110 and the storage means 200, the two units 110, 120 being connected by an optical fibre 130 with double strands 131, 132 and with double cores.

The electronic control unit 120 comprises:
- an emitter connected to the first strand 131 of the optical fibre 130 capable of emitting an optical signal. Advantageously, the emitter is a laser emitter which emits a laser pulse at a wavelength chosen specifically for its capacity not to suffer from interference in a medium saturated with water vapour; as an example, the laser emitter emits a pulse at 532 nm;
- a receiver connected to the second strand 132 of the optical fibre 130, such as a photomultiplier detector;
- a processing unit making it possible to carry out the measurement of the time of flight of the laser pulse between the emission and the reception of the laser pulse reflected by the surface of the water.

The optical unit 110 comprises means for collimating the laser beam at the output of the optical fibre 130, to enable the parallelisation of the rays towards the measurement point, in order to collect all of the beams reflected on the surface of the water and to redirect it towards the optical fibre 130. Such means are for example alignment lenses and/or collimation, focusing or beam expansion lenses. Thus, the optical unit only comprises a single optical channel 112 for the emission and the reception of the optical beam.

The optical fibre 130 is a double core fibre being at the level of a first end (at the level of the control unit 120) in the form of two dissociated strands 131, 132 (i.e. that each strand having an optical core surrounded by an optical sheath). At the level of a second end (at the level of the optical unit 110), the optical fibre 130 is in the form of a single strand 133 with double cores 134, 135, the two cores 134, 135 being juxtaposed and surrounded by a single optical sheath 136. The whole of the optical fibre 130 may also be covered with a protective sheath (not represented).

Figure 2:
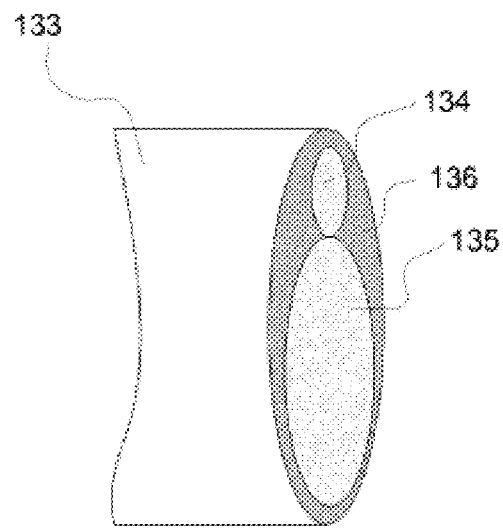
FIG. 2 particularly illustrates one end of the optical fibre of the optical device according to the invention.

At the level of the second end represented schematically in FIG. 2, the two cores 134, 135 are juxtaposed and in direct contact with each other, that is to say that they are each devoid of their optical sheath or their protective sheath. The core 134 is used for the emission and the core 135 having a greater diameter is used for the reception of the reflected signal so as to optimise the reception of the reflected signal. The two cores 134, 135 are juxtaposed over a defined length making it possible to ensure a backscattering of the laser signal emitted between the two cores. This juxtaposition length may be for example comprised between 0 and 10 mm. However, it is also envisaged to juxtapose the two cores 134, 135 over a length greater than 10 mm in certain configurations as long as the backscattering function is ensured.

Thus, the optical fibre 130 according to the invention makes it possible, in addition to transmitting the emitted laser signal to the optical unit 110 via the core 134, to recover via the core 135 a part of the emitted laser signal, by backscattering between the two cores 134, 135, and to transmit it to the control unit 120.

The use of a double core optical fibre 130 according to the invention makes it possible to have a so-called monostatic system (i.e. with the use of the same optical channel both for the emission and for the reception of the optical signal) and makes it possible to define a reference time at each measurement without the use of an external clock and without carrying out a prior calibration step. This is enabled by the scattering of the laser pulse emitted through the strand 131 to the strand 132 thanks to the coupling of the two cores 134, 135 at a precise and known point, i.e. at the level of the optical unit 110 and more specifically of the upper point of the storage means.

Thanks to the optical fibre 130 according to the invention, the calculation of the level of water 210 in the storage means 200 is performed according to the synoptic diagram illustrated in FIG. 3 which illustrates the main steps of the method for determining the level of water by means of the device 100.

During a first step 310, the laser emitter of the control unit 120 emits a laser pulse at a reference time $t_0$. The laser pulse travels through the optical fibre 130, and more specifically the first strand 131, to arrive at the second end of the optical fibre (single strand) situated at the level of the optical block 110. At the level of this end, a part of the photons of the laser pulse is collimated through the optical unit 110 and directed towards the surface of the water and a part is backscattered from the first core 134 to the second core 135. The backscattered photons are conveyed to the control unit 120 via the second strand 132. Thus, during a second step 320, the photomultiplier of the control unit 120 detects the backscattered photons of the emitted signal at an instant $t_1$ (first peak illustrated on the graph of FIG. 4). The instant $t_1$ defining a temporal reference.

The collimated part of the laser pulse, directed towards the surface of the water, is reflected towards the optical unit, and the photons reflected and transmitted through the second strand 132 are captured by the photomultiplier of the control unit 120. The third step 330 of the method thus consists in detecting the photons reflected by the surface of the water at an instant $t_2$ (second peak illustrated in the graph of FIG. 4).

During a fourth step 340, the control unit determines the measurement of the distance d by measurement of the time of flight (TOF) of the optical signal by difference between the first peak (designated reference peak) detected at the instant $t_1$ and which corresponds to the emitted laser signal traversing the optical fibre 130 and reinjected by backscattering inside the fibre 130, and the second peak detected at the instant $t_2$ which corresponds to the laser signal reflected by the surface of the water, traversing the optical block and transmitted to the control unit 120 via the optical fibre 130.

Thanks to the invention, it is thus not necessary to have available an external clock (or trigger), the signal emitted and backscattered in the optical fibre 130 playing the role of artificial optical "clock" by defining a unique reference time for each measurement of the water level. Thus, the optical device according to the invention makes it possible to circumvent any problem of time shift of an electronic clock.

The optical device according to the invention also makes it possible of do without a prior step of calibration in so far as it is not necessary to know the exact position of the optical unit 110. Indeed, this so-called monostatic solution and such as illustrated in FIG. 5a, as opposed to biostatic solutions known from the prior art and such as illustrated in FIG. 5b using an optical block or channel for the emission and a distinct optical block or channel for the reception, is less sensitive to vibrations (no risk of misalignment of the two optical blocks). Thus, the measurement of the level of water is carried out directly, in a robust and reproducible manner even in the event of displacement of the optical unit due for example to vibrations of the vessel.

In addition, as illustrated in FIGS. 5a and 5b, the monostatic solution according to the invention makes it possible to have a better overlap Tx of the field of view of the optical block between the emission and the reception of the laser signal and makes it possible to carry out measurements at smaller distances than with a bistatic device according to the prior art illustrated for comparison purposes in FIG. 5b.

The use of an optical fibre 130 with two cores 134, 135 juxtaposed at the level of the optical unit also makes it possible to optimise the recovery of the return signal of the laser following the reflection of the signal on the surface of the water and to maximise the signal to noise ratio.

The invention claimed is:

1. An optical device for a contactless measurement of a level of a liquid contained in a storage device by means of an optical signal, said optical device comprising:
    an optical unit fixedly positioned above the storage device,
    an electronic control unit configured to emit an optical signal, dissociated from said optical unit and positioned at a distance from said optical unit, and
    an optical fibre configured to transmit the optical signal emitted by the electronic control unit and an optical signal reflected by the liquid, wherein:
        the optical unit comprises a single channel for emission and reception of the optical signal;
        the optical unit is connected to the electronic control unit through said optical fibre
        said optical fibre having first and second optical cores that juxtapose each other such that at least a part of the optical signal emitted in said first optical core of said optical fibre is backscattered in said second optical core, and the first and second cores of said optical fibre juxtapose each other at a level of a first end of said optical fibre so as to form a single strand and each core is devoid of optical sheath or protective sheath.

2. The optical device for the contactless measurement of the level of a liquid contained in a storage device according to claim 1, wherein said first end of said optical fibre is situated at a level of said optical unit.

3. The optical device for the contactless measurement of the level of a liquid contained in a storage device according to claim 1, wherein the first and second optical cores have a different diameter.

4. The optical device for the contactless measurement of the level of a liquid contained in a storage device according to claim 1, wherein the first optical core transmitting the optical signal emitted by the electronic control unit has a diameter less than the second optical core configured to receive the optical signal reflected by a surface of the liquid.

5. The optical device for the contactless measurement of the level of a liquid contained in a storage device according to claim 1, wherein at a level of a second end of said optical fibre connected to the electronic control unit and said optical fibre has two distinct strands, each being composed of a single optical core at the level of the second end.

6. The optical device for the contactless measurement of the level of a liquid contained in a storage device according to claim 1, wherein the electronic control unit comprises a system configured to determine a distance separating said optical unit from the liquid contained in the storage device by measurement of a time of flight of the optical signal.

7. A method for determining the level of a liquid contained in a storage device by means of an optical device according to claim 1, comprising:
   emitting an optical signal by said electronic control unit, said optical signal propagating inside said optical fibre in a direction of the optical unit;
   detecting at an instant t1 a first return signal corresponding to a part of said emitted optical signal backscattered inside the optical fibre at a level of the first and second juxtaposed cores;
   detecting at an instant t2 a second return signal corresponding to a part of the emitted signal which is reflected by a surface of said liquid contained in the storage device;
   calculating the level of the liquid by determination of a time of flight between the instant t1 of detecting the first return signal and the instant t2 of detecting the second return signal.

8. The method for determining the level of a liquid contained in a storage device by means of an optical device according to claim 7, wherein the level of liquid is a level of water in a nuclear reactor fuel pool.

* * * * *